(12) United States Patent
Zázrivec et al.

(10) Patent No.: US 8,266,180 B2
(45) Date of Patent: Sep. 11, 2012

(54) VALIDATION OF DATABASE SCHEMA UPGRADES USING A DATA DIFFERENCING TOOL

(75) Inventors: Milan Zázrivec, Brno (CZ); Jan Pazdziora, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 12/789,209

(22) Filed: May 27, 2010

(65) Prior Publication Data

US 2011/0295876 A1 Dec. 1, 2011

(51) Int. Cl.
*G06F 17/30* (2006.01)

(52) U.S. Cl. ........ 707/791; 707/601; 707/602; 707/608; 707/802; 707/828

(58) Field of Classification Search ........... 707/600–861
See application file for complete search history.

(56) References Cited

U.S. PATENT DOCUMENTS

| 5,717,924 A | 2/1998 | Kawai |
| 2004/0019586 A1 | 1/2004 | Harter |
| 2006/0020619 A1 | 1/2006 | Netz |
| 2008/0077632 A1 * | 3/2008 | Tysowski et al. ............ 707/204 |
| 2011/0093469 A1 | 4/2011 | B'Far |

OTHER PUBLICATIONS

"Denormalization", accessed at: http://en.wikipedia.org/wiki/Denormalization on Feb. 11, 2010, last updated Feb. 10, 2010, 2 pages.
"Materialized View", accessed at: http://en.wikipedia.org/wiki/Materialized-view on Feb. 11, 2010, last updated Nov. 13, 2009, 1 page.
Database Normalization, accessed at: http://en.wikipedia.org/wiki/Database_normalization on Feb. 11, 2010, last updated Feb. 2, 2010, 10 pages.
"SQL Create View Statement", accessed at: http://infogoal.com/sql/sql-create-view.htm on Feb. 18, 2010, 2 pages.
Oracle® Database Concepts, 1 g Release 2 (11.2) Part No. E10713-05, Tables and Table Clusters, 32 pgs, May 27, 2010, http://download.oracle.com/docs/cd/E11882_01/server.112/e10713/tablecls.htm#CNCPT111.
Red Hat, Inc. Non-Final Office Action for U.S. Appl. No. 12/713,919, mailed Oct. 27, 2011.
Red Hat, Inc. Notice of Allowance for U.S. Appl. No. 12/713,919, mailed Apr. 12, 2012.

* cited by examiner

*Primary Examiner* — Isaac M Woo
(74) *Attorney, Agent, or Firm* — Lowenstein Sandler PC

(57) ABSTRACT

An upgrade controller that compares the contents of a reference database with an upgraded database is described. In one embodiment, the upgrade controller connects to the reference and upgraded database and retrieves the list of tables. For each of the tables, the upgrade controller compares the content of the reference and the upgraded table. The upgrade controller compares the table contents by comparing the contents on a record-by-record basis. In addition, the upgrade controller can use a whitelist of tables and columns to reduce the number of false positive(s) that could be generated during the comparison.

20 Claims, 6 Drawing Sheets

VALIDATION OF DATABASE SCHEMA UPGRADES USING A DATA DIFFERENCING TOOL

TECHNICAL FIELD

Embodiments of the present invention relate to a method and system for validating database schema upgrades. Specifically, embodiments of the invention relate to using a data differencing tool to validate database contents after an upgrade of the corresponding database.

BACKGROUND

Operators employ system management solutions to assist in managing multiple computers, from tens of computers to over tens of thousands computers. System management systems can be used to inventory the hardware and software on these computers, install and update software on these computers, collect and distribute custom software packages into manageable groups, provision computers, manage and deploy configuration files, monitor these computers, provision and start/stop/configure virtual guests, and distribute content across multiple geographical sites in an efficient manner. Because of the large numbers of computers that can be managed by the system management solutions, large amounts of information pertaining to the managed computers are generated by these solutions.

To support this large amount of stored information, the system management solution includes a database management system. A database management system is a software system that is used for building, maintaining and accessing a database. There are several database management systems known in the art that can be employed by a systems management solutions (ORACLE™ Database Management System (DBMS), MYSQL™, IBM DB2™, POSTGRESQL™, MICROSOFT SQL™, etc.).

When a new version of the system management server is released, there can be a problem of schema upgrades. If database schema upgrades are not verified, database schema of system management system which was upgraded from older version might have different database schema definitions and content of database tables than database schema which was installed as part of fresh system management system installation. This difference can pose a large problem for operators and support staff of the system management servers because even minor differences can have a severe impact on a system management server functionality, performance, and usability.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

An upgrade controller that compares the contents of a reference schema with an upgraded schema is described. In one embodiment, the upgrade controller connects to the reference and upgraded database and retrieves the list of tables. For each of the tables, the upgrade controller compares the content of the reference and the upgraded table. The upgrade controller compares the table contents by comparing the contents on a record-by-record basis. In addition, the upgrade controller can use a whitelist of tables and columns to reduce the number of false positive(s) that could be generated during the comparison.

Figure 1:
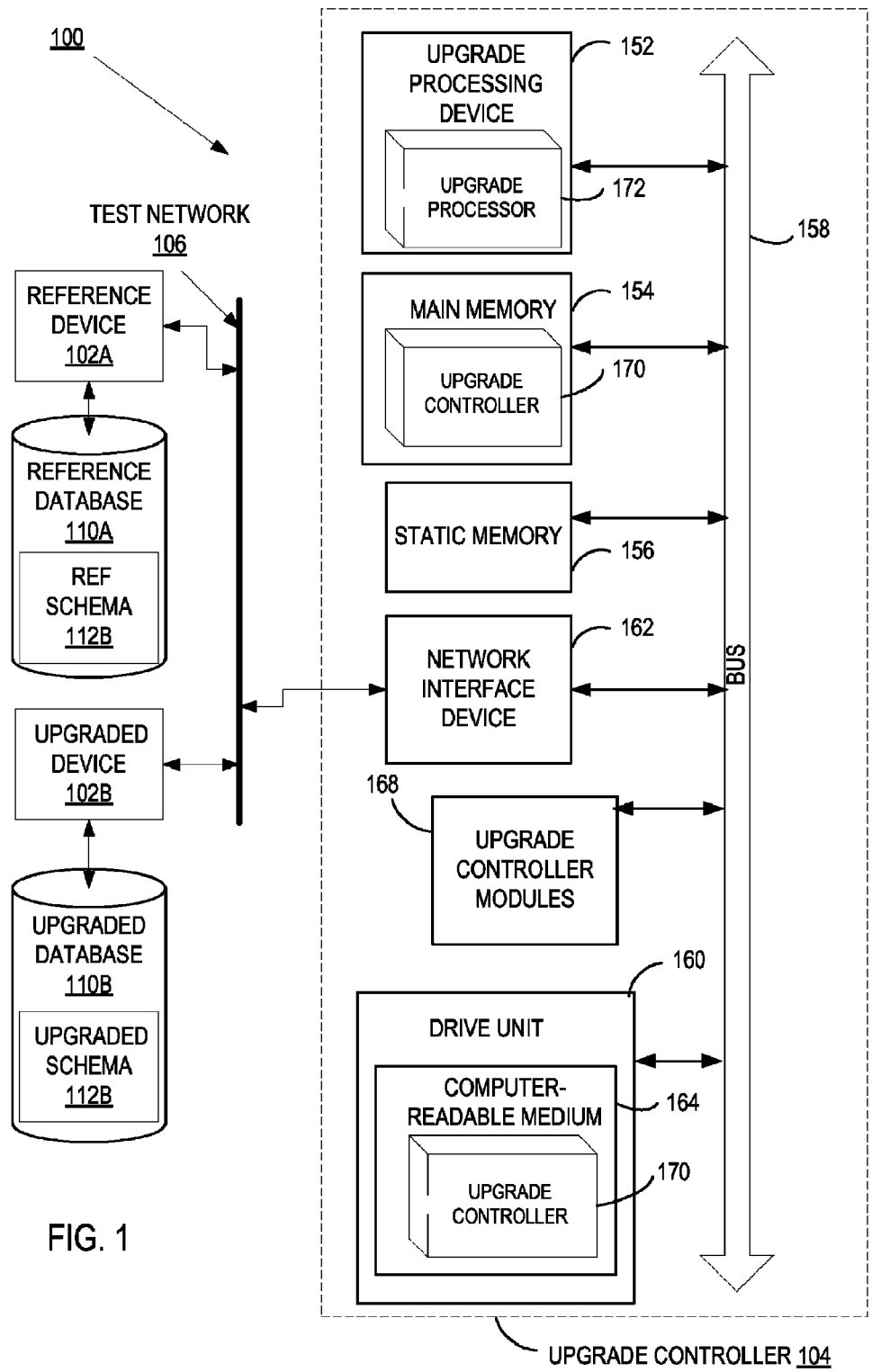
FIG. 1 is a block diagram of one embodiment of a database testing system that includes an upgrade controller.

FIG. 1 is a block diagram of one embodiment of a database testing system 100 that includes an upgrade controller 104 that compares the content of a reference schema 112A with the contents of an upgraded schema 112B. In FIG. 1, testing system 100 includes a test network 106 that couples reference device 102A, reference database 110A, upgraded device 102B, upgraded database 110B, and the upgrade controller 104. Each of the databases 110A-B have a corresponding schema 112A-B. A database schema is a structure of a database that defines the tables, columns, and other structure of the database. In one embodiment, the test network 110 allows data communications between the devices coupled to this network. For example and in one embodiment, the test network is a testbed for devices 102A-B being tested. Devices 102A-B can be one of a personal computer, laptop, cell phone, smartphone, or another type of device that can interact with schemas 112A-B and be used for systems management.

In one embodiment, reference and upgraded devices 102A-B are devices used as a system management server. As described above, a system management server is used to assist in managing multiple computers, from tens of computers to over tens of thousands computers. In this embodiment, each device 102A-B includes a schema 112A-B that is used to store information regarding the computers the device 102A or 102B would be managing. In one embodiment, the databases 110A-B would include information such as computer profiles, hostnames, list of installed packages, hardware info, relation to software channels, etc.

A problem can occur when content of the reference and upgraded schemas differ in a way that affects the upgraded device's ability to act as a system management server. For example in one embodiment, a difference in the upgraded schema 112B can affect the functionality, performance, and/or usability of the upgraded device 102B to act as a system management service as compared with the reference device 102A.

To determine any possible differences in the schema, an upgrade controller 104 compares the contents of the reference 112A and upgraded 112B schemas to determine if there are any meaningful differences. In one embodiment, upgrade controller 104 can be one of a personal computer, laptop, cell phone, smartphone, or another type of device that can interact with databases 110A-B and be used for comparing database contents. In one embodiment, the upgrade controller 104 includes an upgrade processor 172 that compares the reference 110A and upgraded 110B databases. In one embodiment, the upgrade processing device 152 connects to each of the databases 110A-B and retrieves the list of tables. For each of the tables that is common to both of the databases, the upgrade processing device 152 compares the contents of the tables of interest. In one embodiment, the tables that are common to the reference 110A and the upgraded 110B schemas are identified by a common identifier.

As illustrated in FIG. 1, the upgrade controller includes additional components (blocks 152-172). These additional components (blocks 152-172) are described in further detail below.

Figure 2:
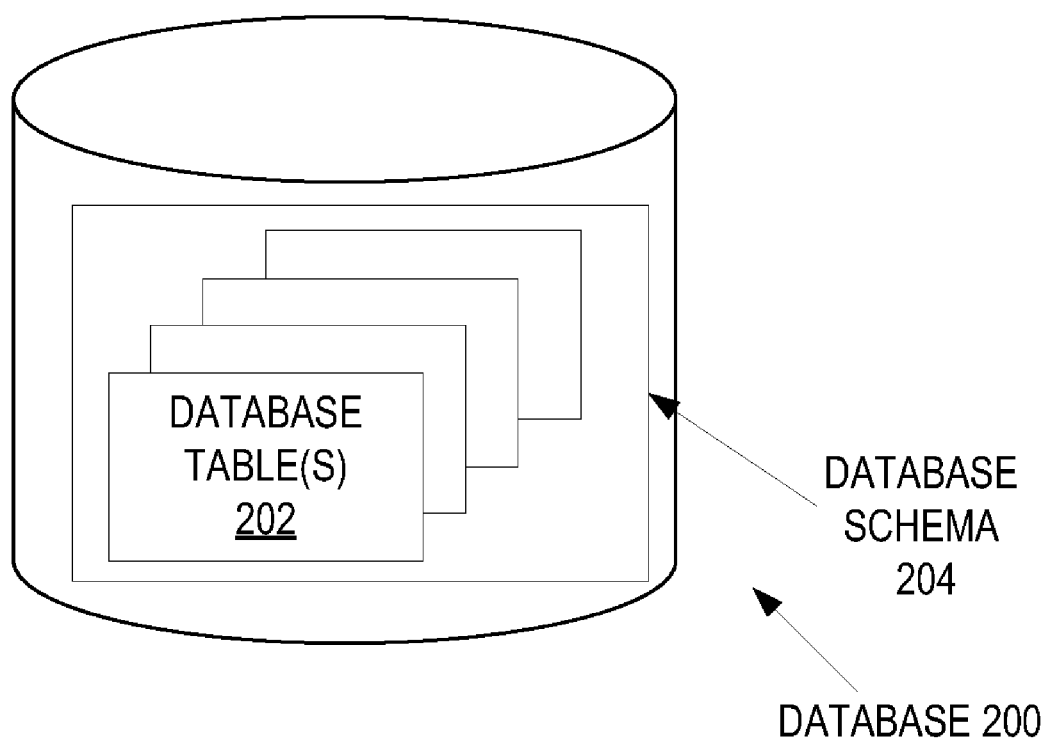
FIG. 2 is a block diagram of one embodiment of a database that includes multiple database tables.

FIG. 2 is a block diagram of one embodiment of a database 200 that includes a database schema 204 and multiple database tables 202. In one embodiment, database is a relational database. A relational database is typically composed of one or more tables according to a database schema. A database schema is a structure of a database that defines the tables, columns, and other structure of the database. In an alternate embodiment, the database can be another type of database known in the art (object-oriented database, flat file, etc.). In one embodiment, database schema 204 includes the structure of the databases table(s) 202.

Figure 3:
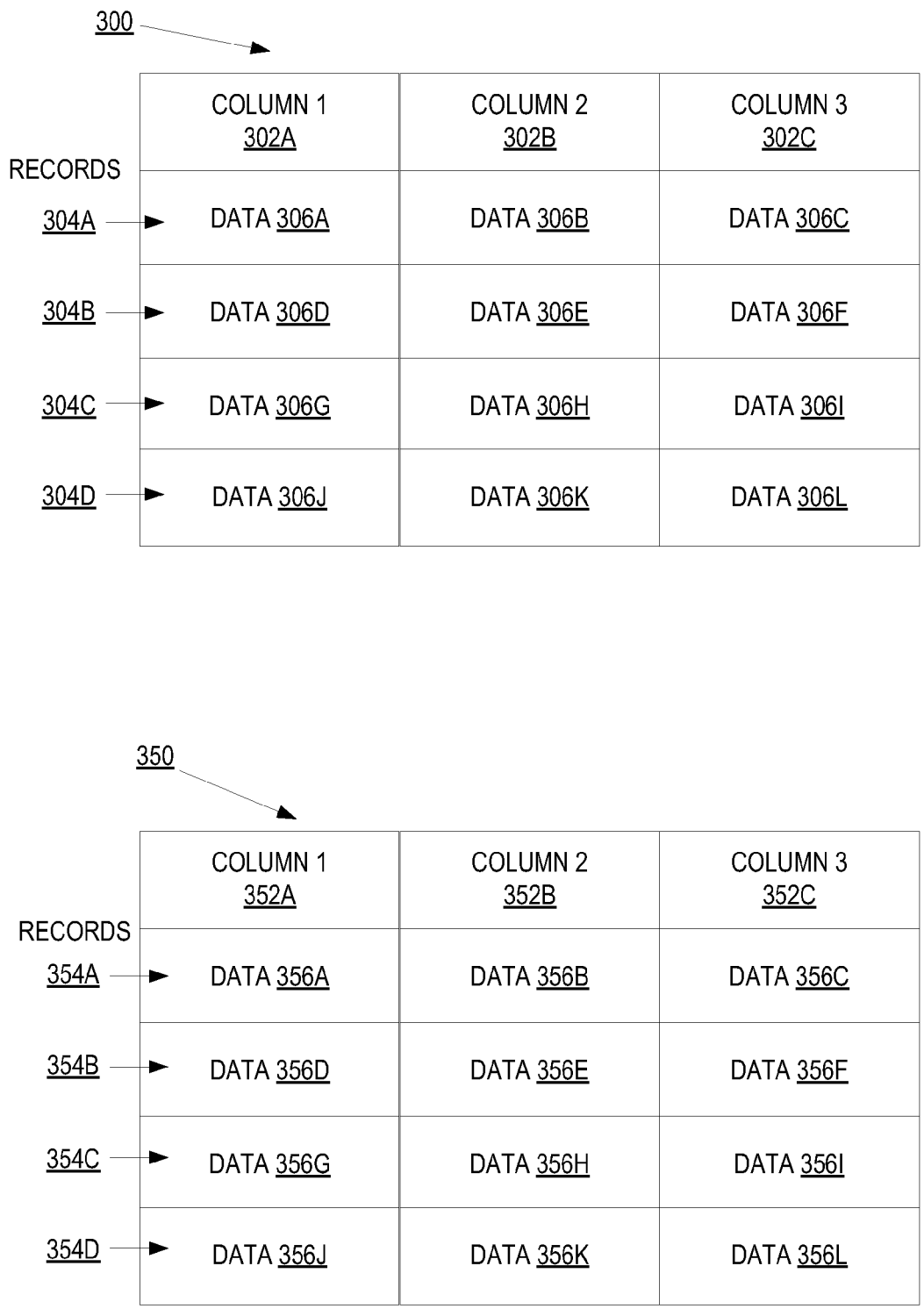
FIG. 3 is a block diagram of one embodiment of a reference database table and an upgraded database table.

FIG. 3 is a block diagram of one embodiment of a reference database table 300 and an upgraded database table 350. In one embodiment, each of the database tables includes a number of columns. In this embodiment, the reference table 300 has columns 302A-C and records 304A-D. In one embodiment, the columns 302A-C are part of the schema for the reference table 300 and the records 304A-D contain the data. Also illustrated in FIG. 3 is the upgraded table 350 that includes columns 352A-C and records 354A-D.

In one embodiment, the upgrade controller 104 compares the content of the reference 300 and upgraded database table 350. In this embodiment, the upgrade controller 104 orders the columns for each of the tables (e.g., columns 302A-C for the reference table 300 and columns 352A-C). In one embodiment, these columns are ordered to remove any differences in the column ordering. The natural order of the columns can depend on the order in which the schema was upgraded. To assist in the comparison, it is useful to sort the columns. The columns can be ordered using an index, ordered sequentially, etc., or other ways of ordering columns as known in the art.

In one embodiment, one or more of the columns can be in a whitelist. A whitelist is a list of columns that can be allowed to have different values. For example in one embodiment, these columns could differ because the columns would have timestamps that differ, user supplied data that meant to be kept and may not be in the reference database, automatically generated data (e.g., identification numbers), surrogate keys, etc. Because whitelisted columns can have differing values, the upgrade controller 104 ignores the data associated with the whitelisted columns during the comparison. For example in one embodiment, column two is a whitelisted column for both tables, so the upgrade controller 104 would ignore the data associated with column two when comparing the data in records 304A-D and 354A-D.

This column whitelist additionally helps reduce the number of false positives that can occur when comparing the data in the two tables. For example in one embodiment, without a column whitelist, known differences due to differing timestamps, user data, automatically generated data (e.g., identification numbers), surrogate keys, etc. would lead to positive designations of differences that are not of interest to the operator reviewing the results of the difference testing. Using the whitelist of columns (and tables as described further below), restricts the difference testing to columns that are of interest to the operator.

Figure 4:
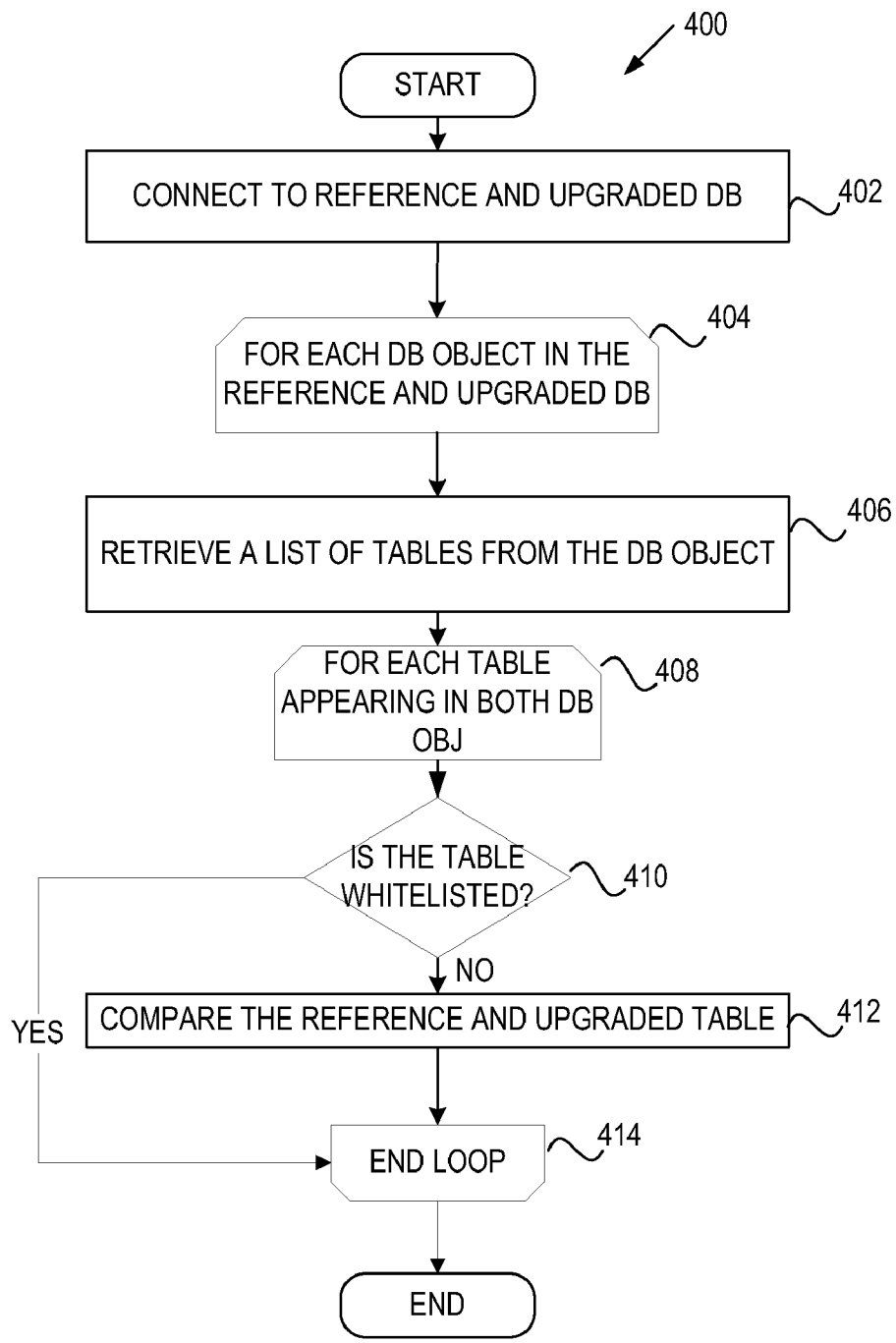
FIG. 4 is a flowchart of one embodiment of a process for comparing the contents of a reference database and an upgraded database.

As described above, the upgrade controller 104 can be used to compare the differences of the reference 110A and upgraded 110B databases. FIG. 4 is a flowchart of one embodiment of a process 400 for comparing the contents of a reference database and an upgraded database. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by an upgrade controller, such as upgrade controller 104 or the upgrade processor 108 of the upgrade controller 104 of FIG. 1. While this process 400 is described with reference to a database used for system management servers, the process can be generally applied to comparisons of other types of databases known in the art (relational databases, object-oriented databases, flat-file databases, etc.

Referring to FIG. 4, process 400 begins with processing logic connecting to the reference and upgraded databases. In one embodiment, process 400 issues a connection command to a device that is running a database management program that is controlling the reference and/or upgraded databases at block 402. For example in one embodiment, process 400 issues a connection command to reference device 102A to connect with reference schema 112A and a separate connection command to upgraded device 102B to connect with upgraded schema 112B.

Process 400 executes a first processing loop (blocks 404-414) to compare the contents of each database object in the reference and upgraded database. In one embodiment, a database object is any object a database schema is comprised of (tables, triggers, sequence, index, etc.). At block 406, process 400 retrieves a list of tables from each of the reference and upgraded schema object. In one embodiment, if the database is a relational database, process 400 uses a structured query language (SQL) command to retrieve the list of tables in the schema.

Process 400 execute a second processing loop (blocks 408-414) to compare the contents in the tables of the retrieved list of tables. At block 410, process 400 determines if the current table is whitelisted. Similar to a whitelisted column described above, a whitelisted table is a table that can be allowed to have different values. For example in one embodiment, these tables could differ because the tables would have timestamps that differ, user supplied data that meant to be kept that may not be in the reference database, etc. If the table is whitelisted, execution of process 400 moves to block 414, where the first and second processing loops end. If the table is not whitelisted, process 400 compares the reference and upgraded table at block 412. In one embodiment, process 400 compares the contents of the tables using a record-by-record comparison. Comparing database table contents is further described in FIG. 5 below. Execution proceeds to block 414, where the first and second processing loops end.

Figure 5:
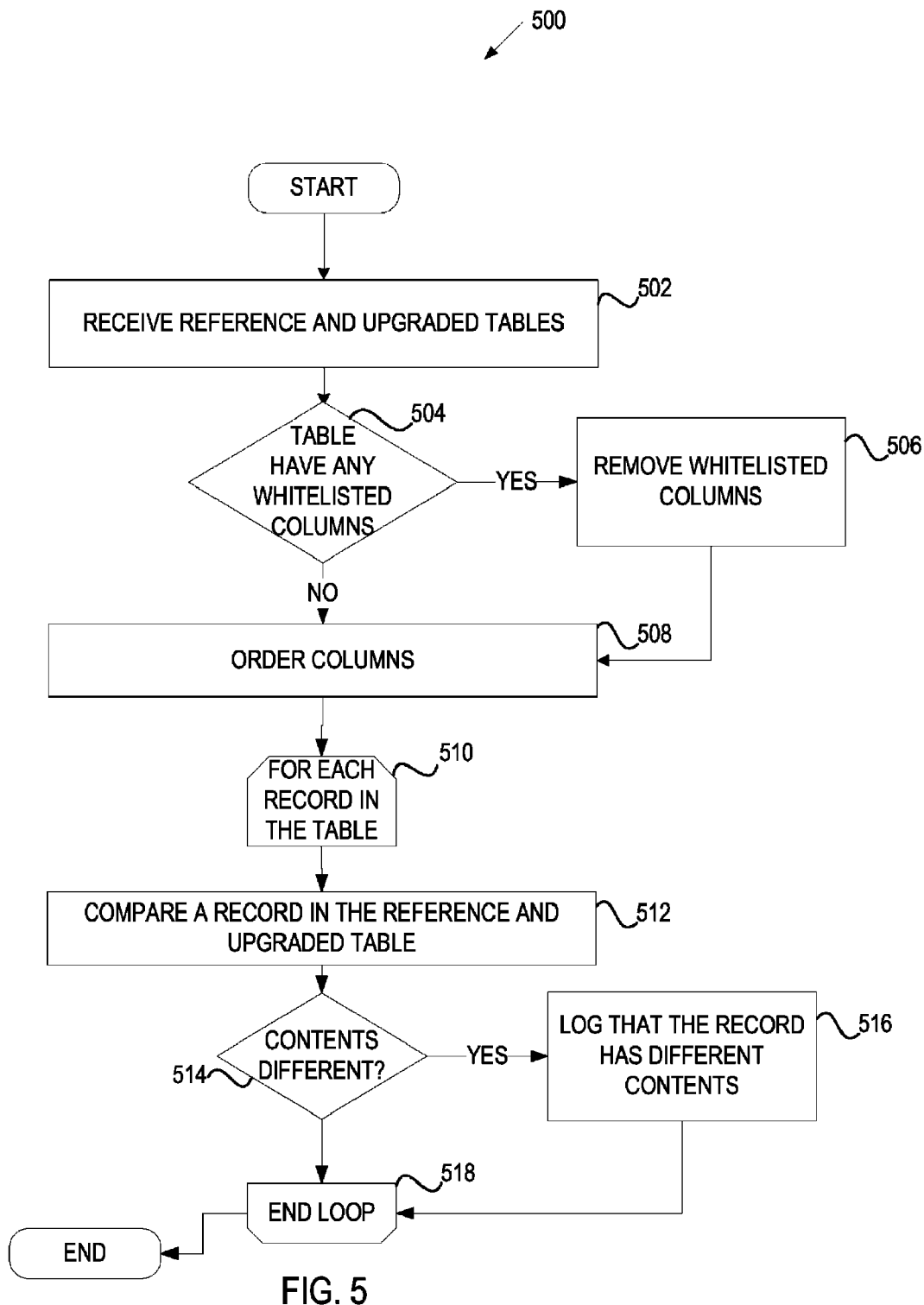
FIG. 5 is a flowchart of one embodiment of a process for comparing the contents of a reference table and an upgraded table.

As described above in FIG. 4, block 412, process 400 compares the content of a table in the reference and upgraded database. FIG. 5 is a flowchart of one embodiment of a process 500 for comparing the contents of a reference database table and an upgraded database table. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 500 is performed by an upgrade controller, such as upgrade controller 104 or the upgrade processor 108 of the upgrade controller 104 of FIG. 1.

Referring to FIG. 5, process 500 begins with processing logic receiving the reference and upgraded tables at block 502. In one embodiment, process 500 receives the table names and a connection object for the reference and upgraded database. In this embodiment, process 500 uses the table name and connection objects to retrieve records from each of the reference and upgraded schema for that table.

At block 504, process 500 determines if the table has any whitelisted columns. In one embodiment, process 500 determines the whitelisted columns by retrieving the schema for this table and comparing the columns in the table schema with a list of whitelisted columns. If there are no whitelisted columns, execution proceeds to block 508. If there are any whitelisted columns, process 506 removes the whitelisted columns from the columns that are used for the comparison below at block 506. Execution proceeds to block 508.

At block 508, process 500 executes a processing loop (blocks 510-518) to compare the contents of the records for each record in the table for the non-whitelisted columns. At block 512, process compares a record in the reference table with a corresponding record in the upgraded table. In one embodiment, process 500 retrieves each record from the tables ordered, stores the records in memory and compares the data in meaningful each column of the record. For example in one embodiment and referring to FIG. 3, process 500 retrieve records 304A and 354A and compare the contents of column 1 and column 3 of these two records. In this example, if column 2 was whitelisted as described in FIG. 3, process 500 would ignore the column 2 contents of the records 304A and 354A for this comparison. If column 2 is not whitelisted, process 500 would include the column 2 contents of the records 304A and 354A for this comparison. For example in one embodiment, process 500 could use the SQL command to select data from table "table" and columns 1 and 3: "select column1, column3 from table order by column3, column1".

At block 514, process 500 determines if the contents of the two records are different. If the contents are different, process 500 logs that the records have different content. For example in one embodiment, process 500 logs that a table (or other database object) is different in the output text with a special mark (e.g., special character) to indicate that this object is different in the two schemas. Executions proceeds to block 518 where the processing loop ends. If the content is not difference, execution proceeds to block 518 where the processing loop ends.

Figure 6A:
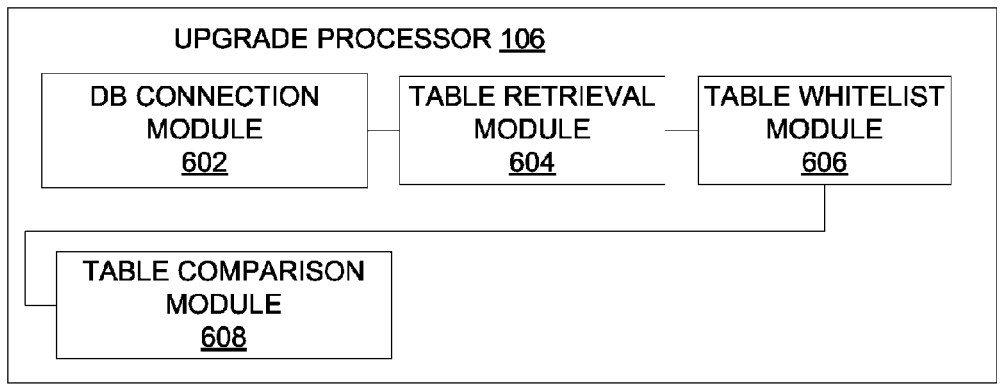
FIG. 6A is a block diagram of an upgrade processor that compares contents of a reference and an upgraded database.

FIG. 6A is a block diagram of an upgrade processor 108 that compares a reference and an upgraded database. In FIG. 6A, upgrade processor 108 includes database connection module 602, table retrieval module 604, table whitelist module 606, and table comparison module 608. Database connection module 602 connects to the reference and upgraded databases as described in FIG. 4, block 402. Table retrieval module 604 retrieves the list of tables for a database as described in FIG. 4, block 406. Table whitelist module 606 determines if the table is whitelisted as described in FIG. 4, block 410. Table comparison module 608 compares the reference and upgraded tables as described in FIG. 4, block 412.

Figure 6B:
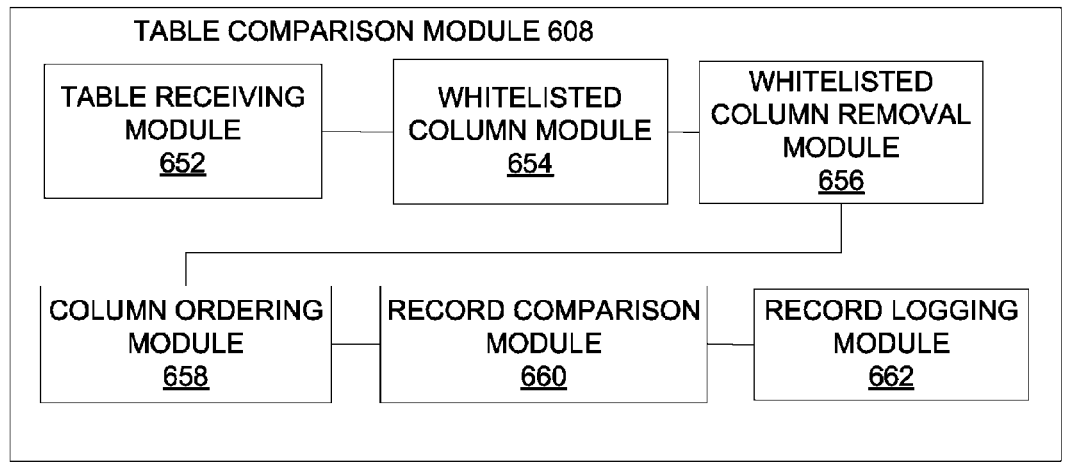
FIG. 6B is a block diagram of a database table comparison module that compares the content of a reference table and an upgraded table.

FIG. 6B is a block diagram of the table comparison module 608 that compares a reference and an upgraded database table. In FIG. 6B, the table comparison module 608 includes table receiving module 652, whitelisted column module 654, whitelisted removal module 656, column ordering module 658, record comparison module 660, and record logging module 662. Table receiving module 652 receives the reference and upgraded tables as described in FIG. 5, block 502. Whitelisted column module 654 determines if the table has any whitelisted columns as described in FIG. 5, block 504. Whitelisted removal module 656 removes the whitelisted columns as described in FIG. 5, block 506. Column ordering module 658 orders the columns as described in FIG. 5, block 508. Record comparison module 660 compares the reference and upgraded records as described in FIG. 5, block 512. Record logging module 662 logs the records that have different content as described in FIG. 5, block 516.

As described above, FIG. 1 includes a diagram of one embodiment of an upgrade controller 104 that compare the reference and upgraded databases. Within the upgrade controller 104 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer comparing the reference and upgraded databases and the server computer acting as one of the database management servers) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary upgrade controller 104 includes an upgrade processing device 152, a main memory 154 (e.g., read-only memory (ROM), flash memory, dynamic random access memory (DRAM) such as synchronous DRAM (SDRAM), etc.), a static memory 156 (e.g., flash memory, static random access memory (SRAM), etc.), and a secondary memory 160 (e.g., a data storage device in the form of a drive unit, which may include fixed or removable computer-readable storage medium), which communicate with each other via a bus 158.

Upgrade processing device 152 represents one or more general-purpose processing devices such as a microprocessor, central processing unit, or the like. More particularly, the processing device 152 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Upgrade processing device 152 may also be one or more special-purpose processing devices such as an application specific integrated circuit (ASIC), a field programmable gate array (FPGA), a digital signal processor (DSP), network processor, or the like. Upgrade processing device 152 is configured to execute the upgrade processor 172 for performing the operations and steps discussed herein. The upgrade controller 104 may further include a network interface device 162.

The secondary memory 160 may include a machine-readable storage medium (or more specifically a computer-readable storage medium) 164 on which is stored one or more sets of instructions (e.g., the upgrade controller 170) embodying any one or more of the methodologies or functions described herein. The upgrade controller 170 may also reside, completely or at least partially, within the main memory 154 and/or within the upgrade processing device 152 during execution thereof by the upgrade controller 104, the main memory 154 and the upgrade processing device 152 also constituting machine-readable storage media. The upgrade controller 170 may further be transmitted or received over a network 718 via the network interface device 162.

The computer-readable storage medium 164 may also be used to store the upgrade controller 170 persistently. While the computer-readable storage medium 164 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The upgrade controller modules 168, components and other features described herein (for example in relation to FIG. 1) can be implemented as discrete hardware components or integrated in the functionality of hardware components such as ASICS, FPGAs, DSPs or similar devices. In addition, the upgrade controller modules 168 can be implemented as firmware or functional circuitry within hardware devices. Further, the upgrade controller modules 168 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "connecting," "retrieving," "comparing," "receiving," "computing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for database comparison been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method to compare a reference database with an upgraded database, the method comprising:

connecting to the reference database and the upgraded database, wherein the reference database has a reference schema and the upgraded database has an upgraded schema;

obtaining a list of reference tables of the reference database using the reference schema and a list of upgraded tables of the upgraded database using the upgraded schema; and for each table that is common in the list of reference tables and the list of upgraded tables, comparing, with an upgrade controller, contents of a corresponding table from the reference database with contents of a corresponding table from the upgraded database if the common table is not included in a whitelist of tables.

2. The computer-implemented method of claim 1, further comprising:

receiving the whitelist of tables, wherein contents of each whitelisted table in the whitelist of tables are permitted to be different between the reference database and the upgraded database; and refraining from comparing the contents of the whitelisted table of the reference schema with the contents of the whitelisted table of the upgraded schema.

3. The computer-implemented method of claim 1, wherein comparing the contents of the corresponding table from the reference database with contents of the corresponding table from the upgraded database comprises:

for each record in the common table, comparing contents of that record in the reference table with contents of the corresponding record in the upgraded table.

4. The computer-implemented method of claim 3, wherein comparing the content of the record further comprises:

ordering the list of columns with an index.

5. The computer-implemented method of claim 3, wherein comparing the content of the record further comprises:

ordering the list of columns sequentially.

6. The computer-implemented method of claim 3, wherein comparing the content of the record further comprises:

receiving a whitelist of columns for the common table, wherein contents of each whitelisted column are permitted to be different between the reference database schema and the upgraded database; and refraining from comparing the contents of the whitelisted column of the reference table with the contents of the whitelisted column of the upgraded table.

7. The computer-implemented method of claim 1, wherein the reference table and the upgraded table have the same identifier.

8. The computer-implemented method of claim 1, wherein each of the reference and upgraded databases is a relational database.

9. The computer-implemented method of claim 1, further comprising:

when the common table has contents that differ between the reference database and the upgraded database, logging a message identifying that the common table has contents that differ between the reference database and the upgraded database.

10. A computer readable storage medium having instructions stored thereon that, when executed by a processing system, cause the processing system to perform a method comprising:

connecting to a reference database and an upgraded database wherein the reference database has a reference schema and the upgraded database has an upgraded schema;

obtaining a list of reference tables of the reference database using the reference schema and a list of upgraded tables of the upgraded database using the upgraded schema; and for each table that is common in the list of reference tables and the list of upgraded tables, comparing contents of a corresponding table from the reference database with contents of a corresponding table from the upgraded database if the common table is not included in a whitelist of tables.

11. The computer readable storage medium of claim 10, wherein the method further comprises:

receiving the whitelist of tables, wherein contents of each whitelisted table in the whitelist of tables are permitted to be different between the reference database and the upgraded database; and refraining from comparing the contents of the whitelisted table of the reference schema with the contents of the whitelisted table of the upgraded schema.

12. The computer readable storage medium of claim 10, wherein comparing the contents of the corresponding table from the reference database with contents of the corresponding table from the upgraded database comprises:

for each record in the common table, comparing contents of that record in the reference table with contents of the corresponding record in the upgraded table.

13. The computer readable storage medium of claim 12, wherein comparing the contents of the record further comprises:

receiving a whitelist of columns for the common table, wherein contents of each whitelisted column are permitted to be different between the reference database and the upgraded database; and refraining from comparing the contents of the whitelisted column of the reference table with the contents of the whitelisted column of the upgraded table.

14. The computer readable storage medium of claim 10, wherein the method further comprises:

when the common table has contents that differ between the reference database and the upgraded database, logging a message identifying that the common table has contents that differ between the reference database and the upgraded database.

15. The computer readable storage medium of claim 10, wherein the reference table and the upgrade table have the same identifier.

16. An upgrade processing device comprising:

a connection module to connect to a reference database and a upgraded database, wherein the reference database has a reference schema and the upgraded database has an upgraded schema;

a table retrieval module, coupled to the connection module, to obtain a list of reference tables of the reference database using the reference schema and a list of upgraded tables of the upgraded database using the upgraded schema; and a table comparison module, coupled to the table retrieval module, to compare, for each table that is common in the list of reference tables and the list of upgraded tables, contents of a corresponding table from the reference database with contents of a corresponding table from the upgraded database if the common table is not included in a whitelist of tables.

17. The upgrade processing device of claim 16, further comprising:

a table whitelist module, coupled to the table comparison module, to receive the whitelist of tables, wherein contents of each whitelisted table in the whitelist of tables are permitted to be different between the reference database and the upgraded database, and the table comparison module to not compare the contents of the whitelisted table of the reference schema with the contents of the whitelisted table of the upgraded schema.

18. The upgrade processing device of claim 16, wherein the table comparison module further configured to:
for each record in the common table,
compare contents of that record in the reference database schema with contents of that record in the upgraded database schema.

19. The upgrade processing device of claim 16, wherein the reference table and the upgraded table have the same identifier.

20. The upgrade processing device of claim 16, wherein each of the reference and upgraded databases is a relational database.

* * * * *